United States Patent [19]

Luukkala

[11] Patent Number: 4,906,107
[45] Date of Patent: Mar. 6, 1990

[54] FIBRE-OPTIC THERMOMETER OR TEMPERATURE ALARM DEVICE

[75] Inventor: Mauri Luukkala, Espoo, Finland

[73] Assignee: Soundek Oy, Finland

[21] Appl. No.: 108,828

[22] PCT Filed: Feb. 11, 1987

[86] PCT No.: PCT/FI87/00024
§ 371 Date: Sep. 29, 1987
§ 102(e) Date: Sep. 29, 1987

[87] PCT Pub. No.: WO87/05103
PCT Pub. Date: Aug. 27, 1987

[30] Foreign Application Priority Data

Feb. 12, 1986 [FI] Finland ................................. 860632

[51] Int. Cl.[4] ..................... G01K 11/12; G01K 11/18
[52] U.S. Cl. .................................... 374/161; 116/101; 340/584
[58] Field of Search ............... 374/104, 131, 160, 161, 374/162, 16, 17, 18, 19; 340/584, 590; 116/101, 207, 216; 250/574

[56] References Cited

U.S. PATENT DOCUMENTS

| | | | |
|---|---|---|---|
| 4,136,566 | 1/1979 | Christensen | 374/161 |
| 4,151,747 | 5/1979 | Gottlieb et al. | 374/161 |
| 4,179,927 | 12/1979 | Saaski | 374/161 |
| 4,201,446 | 5/1980 | Geddes et al. | 374/161 |
| 4,288,159 | 9/1981 | Newman | 374/161 |
| 4,302,970 | 12/1981 | Snitzer et al. | 379/161 |
| 4,307,607 | 12/1981 | Saaski et al. | 73/356 |
| 4,316,388 | 2/1982 | Miller et al. | 374/161 |
| 4,671,651 | 6/1987 | Toyada et al. | 374/161 |
| 4,672,218 | 6/1987 | Chrisman et al. | 250/574 |
| 4,707,134 | 11/1987 | McLachlam et al. | 250/574 |
| 4,718,829 | 12/1987 | Hartog et al. | 374/161 |

FOREIGN PATENT DOCUMENTS

| | | | |
|---|---|---|---|
| 30146522 | 6/1985 | European Pat. Off. | |
| 1907192 | 10/1969 | Fed. Rep. of Germany | 374/161 |
| 2548779 | 1/1985 | France | 374/161 |
| 144516 | 11/1980 | Japan | |
| 12524 | 2/1981 | Japan | |
| 111437 | 9/1981 | Japan | |
| 115930 | 9/1981 | Japan | |
| 0115930 | 9/1981 | Japan | 374/161 |
| 143934 | 11/1981 | Japan | |
| 363430 | 4/1982 | Japan | |
| 0005928 | 1/1984 | Japan | 374/161 |
| 0148333 | 7/1986 | Japan | 374/161 |
| 3850544 | 12/1985 | PCT Int'l Appl. | |
| 0922538 | 4/1982 | U.S.S.R. | 374/161 |
| 1017934 | 5/1983 | U.S.S.R. | 374/161 |
| 1438754 | 6/1976 | United Kingdom | 374/18 |

Primary Examiner—William A. Cuchlinski, Jr.
Assistant Examiner—Thomas B. Will
Attorney, Agent, or Firm—Steinberg & Raskin

[57] ABSTRACT

A theremometer or temperature alarm device making use of fibre optics. The measuring instrument has a fibre-optic light transmitter (1), which sends out light along an optic fibre (2) to a measuring head (5) on the end of the transmitting fibre (2), and a fibre-optic receiver (3), which is connected with an optic fibre (4) to the same measuring head (5). The measuring head (15) is a cell or hollow enclosure (6) which has been filled with a light-scattering substance (7) of the kind which below a certain threshold temperature scatters the incident light from the transmitting fibre (2) back to the receiving fibre (4) but above the threshold temperature characteristic for the substance (7) loses its light scattering capacity so that the light coming from the transmitting fibre (2) is no longer scattered to the receiving fibre (4). Transgression of the threshold temperature characteristic for the substance (7) is observable in the fibre-optic receiver (3) as a diminishing of the back-scattered light and of the signal thereby caused.

6 Claims, 1 Drawing Sheet

FIBRE-OPTIC THERMOMETER OR TEMPERATURE ALARM DEVICE

BACKGROUND OF THE INVENTION

The present invention concerns a thermometer or temperature alarm device making use of fibre optics.

It is necessary in numerous supervision tasks within industry and technology to measure temperature in such a way that an alarm is actuated when the temperature has transgressed a given threshold value. Of course such threshold alarm can be obtained from a conventional electronic thermometer by providing electronic circuits for threshold detection so that an alarm is actuated if the preset temperature is surpassed.

There are however various situations in which one would prefer to forgo the use of a so-called electronic thermometer because such instruments as a rule contain an electrically conductive measuring pick-up, or sensor, to which a voltage has been applied. Typical objects of measurement where this consideration is relevant are, for instance, warehouses containing readily inflammable chemicals, e.g. oil tanks and cisterns, powder stores, etc. In such conditions the electrically conductive pick-up leads may give rise to sparking, and they may for instance carry lightning into the storage space, with disastrous results.

It is possible, of course, in such situations to use so-called temperature pick-ups utilizing fibre optics, which continuously follow the development of temperature and which can be programmed to actuate an alarm if a given critical temperature is surpassed. As is commonly known, measuring instruments, such as thermometers, using fibre optics have the inherent advantage that the optic fibre itself is an insulator and thus cannot cause any harmful electrical phenomena, such as short circuits or sparking, which might cause dangerous situations in an environment susceptible to explosion.

However, fibre-optic thermometers of present art have turned out to be rather complicated and expensive, and this has limited their use. On the other hand, thermometers employing conventional galvanic technology, such as thermocouples, thermistors or NTC and PTC resistance elements, offer a rather inexpensive and reliable solution to surveillance problems as long as there is no apprehension regarding risk of fire or explosion. It is possible especially with PTC and NTC resistors to implement a temperature detection which is specifically of the alarm type because the resistance of these resistors changes most powerfully as a function of temperature in various temperature ranges.

The fibre-optic thermometers known at present are based on the principle that light is carried with an optic fibre to a measuring cell and the material in this cell reacts in one way or another to the temperature so that the change of temperature can be observed by optical means.

One way known in the art is to make use of the temperature dependence of the fluorescence phenomenon caused by light. It is a well-known fact that the intensity becomes less with increasing temperature. Some of the commercially available measuring instruments are based on this phenomenon.

It is also known that the properties of so-called liquid crystals are dependent on temperature in such a way that it is possible to construct thermometers using liquid crystals. Liquid crystals cause a kind of interference phenomena in thin films so that the colour of the liquid crystal film appears to change as a function of temperature in desired manner. A type of paint composed of liquid crystals is known which can be used to coat those objects which are of interest, and one may then observe the changing colour by those means which fibre optics afford. It has to be noted, however, that liquid crystal materials have no particularly long life span: in a way, they are decomposed as they age.

SUMMARY OF THE INVENTION

In the present invention is disclosed a fibre-optic thermometer differing from that which has been described above and which can be used to observe the temperature in a given space and to obtain alarm if the temperature rises over a given critical value. These critical values depend on the material that has been placed in the sensor itself and they are therefore highly reliable and reproducible because in their case no thought need be given to the potential creep of electronically set threshold values. In other words, the threshold values can be derived from the material parameters of the sensor material itself. The pick-ups to be presented here are furthermore highly reliable, simple and inexpensive, as will become apparent later on.

For better understanding the way in which the pick-up operates, the following situation shall be considered in which e.g. in a test tube of glass has been placed snow. When for instance a narrow laser light beam is directed on this test tube, it will be found that no light can pass through the test tube: the light is all scattered from the snow surface. Snow is white, a well-known fact, because it scatters nearly all of the incident light. But if the contents of the test tube are warmed so that the snow therein melts, all light can pass through and hardly anything is scattered back from the surface of the test tube. One knows in that case that the temperature has definitely increased to be higher than the melting point of snow, i.e., 0° C. It follows that in this instance light transmission can be taken as threshold indication of 0° C. temperature. It is obvious, of course, that if the light is introduced with the aid of an optic fibre and its transmission is observed with another optic fibre, it becomes possible to construct a fibre-optic threshold detector.

In the present invention a separate sensor housing is used, which is filled with a material of the above-described kind and the optical properties of which are monitored with optic fibres. Optic fibre transmitters and receivers are known in the art in themselves, but all the same they constitute an important component part in the present invention. Said sensor housing may be filled with a material which melts and turns transparent above a certain temperature which is characteristic for the material in question but is solid and scatters back a great part of the light incident on it, at temperatures below said melting point. Stearine may be mentioned as an example. Below its melting point stearine is white and kind of milky, and it scatters back all light. When it melts, stearine turns transparent and clear like water and transmits all light. Stearine in solid state contains microcrystals of a kind in great numbers, which scatter light and make for instance a candle appear white. On the other hand, stearine has a clearly defined melting point (about 58° C.), above which it becomes transparent. There is available a rather great number of stearines with different melting points so that appropriate alarm threshold temperatures are easy enough to find. There are several other similar materials, such as paraffins, waxes, certain fats and oils. Some of the plastics also turn clear from milky condition when they melt (for instance, polyethylene). All told there exists a quite ample selection of suitable materials and suitable melting or phase transformation temperatures. It is also possible to admix light-scattering crystals to certain oils, which crystals as they melt either let the light pass through or cease to scatter light. In the present invention fibre optics are employed to observe the change in light scattering and the change of light transmission at the melting point or other phase transformation point of the respective material.

It should be clear from the preceding description that a pick-up of this type would be rather simple, inexpensive and reliable in operation owing to its being based on a simple natural phenomenon.

The thermometer or heat alarm device of the invention making use of fibre optics is characterized in that the measuring instrument consists of a fibre-optic light transmitter, which sends out light along an optic fibre to a measuring head provided on the end of the transmitting fibre, and of a fibre-optic receiver, which is connected by an optic fibre to the same measuring head, and that the measuring head consists of a chamber or hollow enclosure which has been filled with a light-scattering substance of the kind which below a given threshold temperature scatters the light coming through the transmitting fibre back into the receiving fibre but above the threshold temperature characteristic of the material loses its light scattering capacity, or becomes transparent, so that the light arriving through the transmitting fibre is no longer scattered to the receiving fibre, whereby transgression of the threshold temperature characteristic of said substance is observable in the fibre-optic receiver as a diminishing of the back-scattered light and of the signal which it produces.

For better understanding of the invention, the design solutions therewith associated shall be gone through in greater detail in the following. An initial observation: the fibre-optic transmitters and receivers are in themselves known in the art and are commercially obtainable as completed units; therefore they are not more closely described here although they constitute part of the invention.

BRIEF DESCRIPTION OF THE DRAWINGS

The invention is described in detail with reference to certain advantageous embodiments of the invention, presented in the figures of the appended drawing, to which however the invention is not meant to be exclusively confined.

DESCRIPTION OF THE PREFERRED EMBODIMENTS

Figure 1:
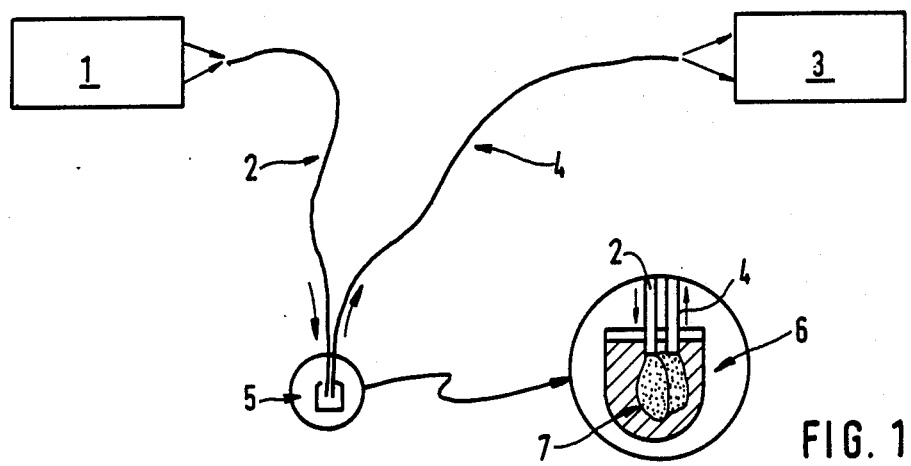
FIG. 1 presents an advantageous embodiment of the thermometer, or temperature alarm device, of the invention in which two separate optic fibres are used, in the form of a schematical diagram.

In FIG. 1, a fibre-optic light transmitter transmits light at a suitable wavelength; in many cases the visible light from a so-called LED lamp is sufficient, but for instance near infra-red light may also be used. The light from the fibre-optic light transmitter 1 proceeds along the fibre 2 to the measuring head 5, which is for instance a measuring cell 6, which has been closely filled with a suitable substance 7, for instance stearine. The light arriving in the transmitter fibre 2 is scattered back from the stearine in such manner that part of its enters the second optic fibre 4 carried to the measuring cell 6 and along which fibre the scattered light reaches the fibre-optic receiver 3, the light arriving there being converted to an electronic signal by means known in themselves in electro-optics. When now the melting point of stearine is reached, the crystallinity of the substance disappears, and this is indicated by the electronic circuit of the fibre-optic receiver 3 as an alarm signal. It should be noted that in an alarm device of this type a signal is received in the receiver 3 all the time while the temperature is below the alarm threshold. This can be characterized as a so-called closed-circuit (continuous current) principle: everything is OK if a return light signal is received; if the light signal has vanished, then either the threshold temperature has been surpassed or the optic fibre has been broken and the condition requires attention in every case.

Figure 2:
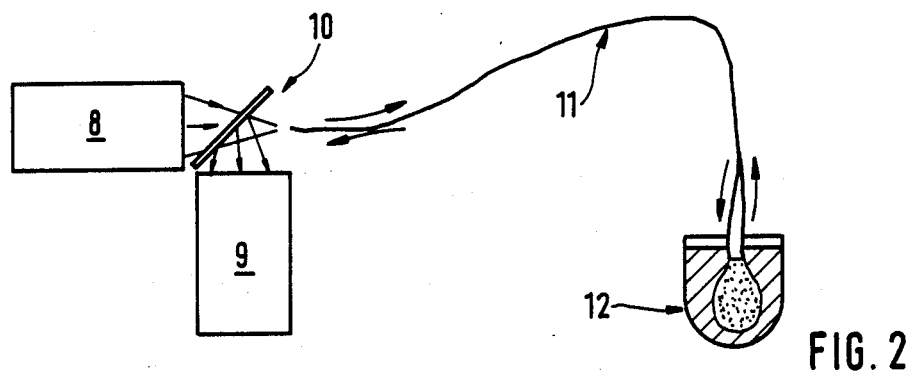
FIG. 2 presents a second advantageous embodiment of the thermometer, or temperature alarm device, of the invention in which one single optic fibre is used, in the form of a schematical diagram.

In FIG. 2 is presented a design which contains only one fibre and which may therefore be better usable in some situations. In this design the fibre-optic light transmitter 8 as well as the fibre-optic receiver 9 has been connected to one and the same fibre 11, using a so-called semitransparent mirror 10. The light proceeding along the fibre 11 arrives at a similar measuring cell 12 as in the preceding embodiment, and if conditions are below the threshold temperature, the stearine or equivalent light-scattering substance in the measuring cell 12 scatters light back along the fibre 11 to the receiver 9, where the light signal, or its absence, can be electronically detected in ways known in the art. It should be noted that the semitransparent mirror 10 used in this embodiment constitutes a design known in itself in electro-optics and therefore needs no special description.

Figure 3:
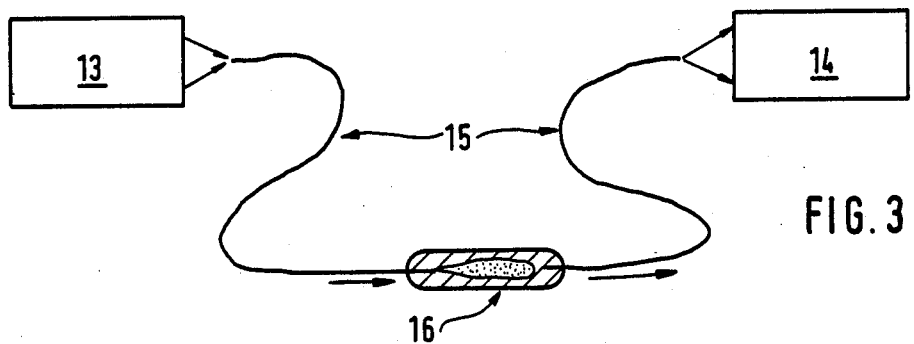
FIG. 3 presents a third advantageous embodiment of the thermometer, or temperature alarm device, of the invention in which the light transmission is directly utilized with the aid of optic fibres, in the form of a schematical diagram.

In FIG. 3 is presented a third embodiment, wherein a fibre-optic transmitter 13 has been connected to a fibre-optic receiver 14 with the aid of a measuring cell 16 and an optic fibre 15 in such manner that when the material in the measuring cell 16 melts or otherwise becomes transparent the light from the transmitter 13 can proceed through the measuring cell 16 all the way to the receiver 14, whereby the threshold temperature causing melting can be electronically recorded in the receiver 14.

It may furthermore be noted that many waxes, like paraffin and stearine, have melting temperatures which occur in rather interesting ranges. Very common melting points of stearine are the temperatures 58, 68 and 78° C., which are located in highly useful ranges in view of practical monitoring operations, for instance. So-called microcrystalline stearine waxes are also available which have melting points in even higher ranges. Also paraffins, for instance, have a number of useful melting points. These melting points are usually quite stable, and changes of barometric pressure, for instance, have little if any effect on them. Stearines and other waxes are also in themselves very durable and stable substances, with minimal chemical changes in the course of time even if they should remain in molten state for prolonged periods. Moreover, the measuring cell may be sealed so tightly that other solvent chemicals cannot destroy the specimens or cause them to change. It is understood that submersion of the pick-up in any oil naturally calls for extra protection, but this circumstance is no essential part of the invention in itself. Stearines and waxes are also insensitive to electric and magnetic fields. It may also be noted that the melting and solidifying process e.g. of waxes incorporates a certain hysteresis phenomenon, which is nothing but an advantage in alarm actuating applications.

I claim:

1. A temperature alarm device making use of fibre optics, characterized in that the device comprises a fiber-optic light transmitter (1), which sends light along a transmitting optic fiber (2) to a measuring head (5) on the end of the transmitting fiber (2), and a fiber-optic receiver (3), which is connected with a receiving optic fibre (4) to the same measuring head (5), and the measuring head (5) comprises a cell or hollow enclosure (6) with said transmitting (2) and receiving (4) fibres extending into said cell or enclosure (6) which has been filled with substantially homogeneous light-scattering substance (7) of the kind which below a certain substantially abrupt threshold temperature scatters the incident light from the transmittting fibre (2) back to the receiving fibre (4), but above the threshold temperature characteristic for the substance (7), loses its light scattering capacity so that the light coming from the transmitting fibre (2) is no longer scattered to the receiving fibre (4), whereby transgression of the threshold temperature characteristic for the substance (7) is observable in the fibre-optic receiver (3) as a diminishing of the back-scattered light and of the signal thereby caused.

2. The device making use of fibre optics according to claim 1, characterized in that the substance in the measuring cell or hollow enclosure is paraffin, stearine, waxes, fats, oils, plastic or another equivalent substance of which the light scattering capacity is high below a certain threshold temperature characteristic for the substance but above a certain threshold temperature characteristic for the substance the substance loses its light scattering capacity or turns transparent.

3. The device of the claim 2, wherein the substance is polyethylene.

4. A temperature alarm device making use of fibre optics, characterized in that the device comprises a fibre-optic transmitter (8) and a fibre-optic receiver (9) which are, with the aid of a semitransparent mirror (10), combined on one fibre (11) which has been connected to and extends into a measuring cell or hollow enclosure (12) which is filled with a substantially homogeneous substance of which the optical light scattering capacity below a certain substantially abrupt threshold temperature causes scattering of the light arriving through the fibre (11) back into the fibre (11) and by that route to the optical receiver (9), but above the certain threshold temperature characteristic for the substance, loses its light scattering capacity, so that transgression of said threshold temperature is observable in the optical receiver (9) as a diminishing of the back-scattered light.

5. The device according to claim 4, wherein the substance in the measuring cell or hollow enclosure is paraffin, stearine, waxes, fats, oils, plastic or another equivalent substance of which the light scattering capacity is high below a certain threshold temperature characteristic for the substance but above a certain threshold temperature characteristic for the substance, the substance loses its light scattering capacity or turns transparent.

6. The device of claim 5, wherein the substance is polyethylene.

* * * * *